Oct. 21, 1952     P. S. VAUGHAN     2,614,549
CYLINDER HEAD
Filed Sept. 27, 1950
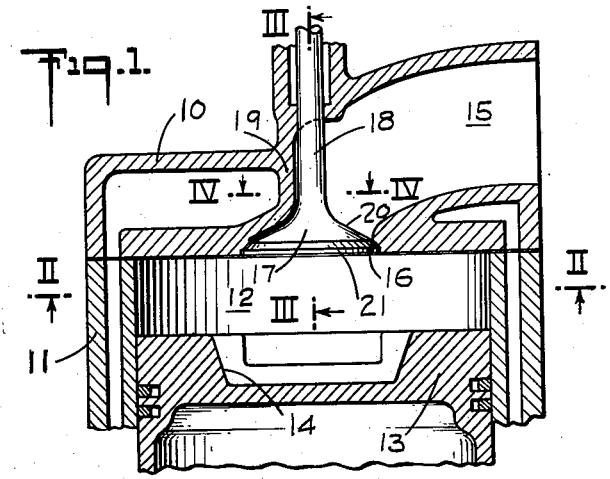
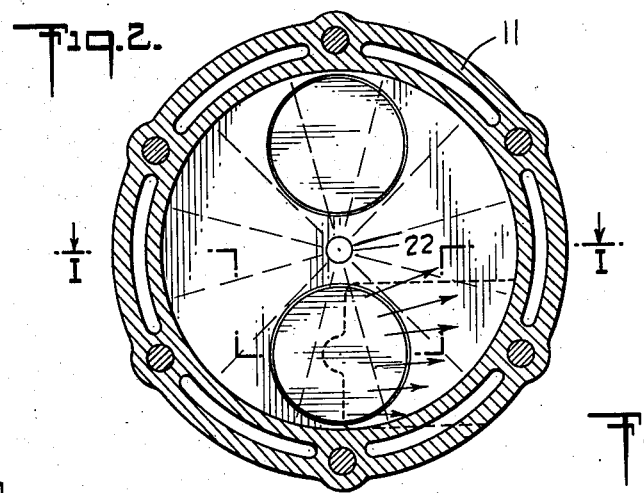
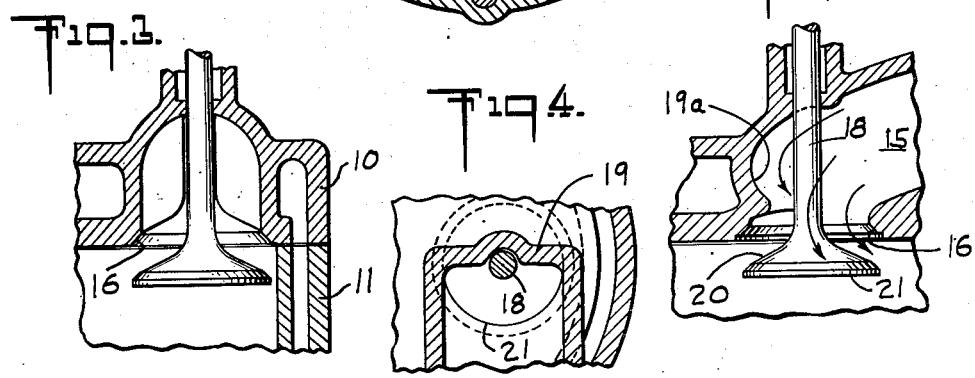
INVENTOR
PAUL S. VAUGHAN.
BY Maurice W. Grady
ATTORNEY Patented Oct. 21, 1952

2,614,549

UNITED STATES PATENT OFFICE 2,614,549

CYLINDER HEAD

Paul S. Vaughan, Schenectady, N. Y., assignor to American Locomotive Company, New York, N. Y., a corporation of New York Application September 27, 1950, Serial No. 187,069

1 Claim. (Cl. 123—188)

This invention relates to compression-ignition engines and particularly to a cylinder head including improved means of effecting turbulence of the air charge to the power cylinders.

In diesel engines of the solid-injection type, the jet of atomized fuel from the injector does not mix uniformly or thoroughly with the air supplied to the power cylinders. Consequently, combustion is not complete. Creating swirling motion in the air charge as it enters the cylinder on the intake stroke of the piston helps solve the problem, and various means of bringing about such turbulence are known. Masking or shrouding the valve head is a common expedient. Such a construction, however, requires means to prevent the valve from turning on its stem. If the valve is not allowed to turn, the valve seat is invariably subjected to uneven wearing.

The principal object of the invention is to provide a shroud or air guide on the cylinder head designed to cooperate with the head on the inlet valve to direct the flow of air charge as it enters and spreads through the power cylinder thereby to impart a rotary swirling motion thereto. Another object is to provide a wall structure in the inlet passage of the cylinder head to coact with the inlet valve to guide the air charge into the power cylinder to intercept the fuel spray in a manner to produce effective combustion. These and other objects are effected by the invention as will be apparent from the following description and claim taken in conjunction with the accompanying drawings.

In the drawings, Fig. 1 is a sectional view of portions of the cylinder head, cylinder, and piston assembly with the inlet valve in closed position; Fig. 2 is a section taken along the line II—II of Fig. 1; Fig. 3 shows the inlet valve in open position; Fig. 4 is a section taken along line IV—IV of Fig. 1; and Fig. 5 is a fragmentary section of an alternate construction of the invention.

In the drawings, cylinder head 10 is secured to cylinder 11 by conventional means to form the combustion chamber 12 of a compression-ignition engine. Piston 13 reciprocates in the cylinder and the length of its stroke is so designed that on the power stroke, the marginal zone of the crown of the piston closely approaches head 10 in order to effect a "squishing" or radially inward action of the combustion supporting air toward the axis of the chamber. To provide sufficient volume for an effective combustion chamber, depression 14 is formed in the crown of the piston.

Intake passage 15 is generally circular in cross section and is provided with valve seat 16 adjacent the combustion chamber. Intake valve 17 reciprocates conventionally as actuated by linkage from the cam shaft. On the downstream side of the valve stem 18, the wall of passage 15 is formed with an inwardly projecting portion 19 extending across the passage normally to the course of the incoming air. Portion 19 is shaped in its upper mid-section to conform to the curvature of valve stem 18 and in its lower mid-section to the circular shoulder 20 of the valve head 21. Portion 19 is spaced slightly from the valve stem and shoulder to allow for operating clearances; and, as best shown in Fig. 4, it extends across the intake passage so that the incoming air will encounter it and be turned back to stream along the curved shoulder 20 of the valve head. The incoming air is thus directed into the cylinder chamber in a course indicated by the arrows (see Figs. 2 and 4).

The spray of fuel from the injector 22 is conical. The incoming air, as guided by the invented structure, streams into the combustion chamber and follows the cylinder wall in a circular course around the chamber. It will thus intersect the conical fuel spray at substantially right angles. The rotary movement of the mass of air thus produced in the combustion space brings fresh air continuously across the stream of fuel, and the fuel and oxygen, as they are united in the combustion process, are circulated through the chamber to facilitate further combustion.

Fig. 5 illustrates an alternate construction of the invention. Projection 19 is provided with a dished cavity 19a adjacent stem 18 and facing the stream of incoming air. Incoming air will rush past the stem into the dished portion and be reverted downwardly to pass along the shoulder 20 into the combustion space in the course indicated by the arrow.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claim are contemplated as a part of this invention.

What I claim is:

In combination, a cylinder head for a compression-ignition engine; an intake passage therein; an intake valve having a stem, a head, and a connecting shoulder therebetween; and a projecting portion on the passage wall shaped to conform to the valve stem and to the valve shoulder, said portion being disposed closely adjacent said stem and shoulder when the valve is in seated position and extending across the intake passage normal to the direction of flow of the incoming air and being thereby adapted to guide the course of the incoming air along the valve shoulder into the combustion chamber.

PAUL S. VAUGHAN.

REFERENCES CITED

The following references are of record in the file of this patent:

UNITED STATES PATENTS

| Number | Name | Date |
|---|---|---|
| 1,443,110 | Abell | Jan. 23, 1923 |
| 1,897,293 | Bailey | Feb. 14, 1933 |
| 2,062,951 | Treiber | Dec. 1, 1936 |
| 2,183,674 | Erren | Dec. 19, 1939 |